(12) United States Patent
Ikawa et al.

(10) Patent No.: US 11,072,379 B2
(45) Date of Patent: Jul. 27, 2021

(54) TIRE DEFLECTOR DEVICE

(71) Applicant: MAZDA MOTOR CORPORATION, Hiroshima (JP)

(72) Inventors: Yuki Ikawa, Hiroshima (JP); Masaru Chikita, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 97 days.

(21) Appl. No.: 16/491,045

(22) PCT Filed: Feb. 20, 2018

(86) PCT No.: PCT/JP2018/005977
§ 371 (c)(1),
(2) Date: Sep. 4, 2019

(87) PCT Pub. No.: WO2018/163803
PCT Pub. Date: Sep. 13, 2018

(65) Prior Publication Data
US 2020/0010129 A1 Jan. 9, 2020

(30) Foreign Application Priority Data

Mar. 6, 2017 (JP) .............................. JP2017-041305
Mar. 6, 2017 (JP) .............................. JP2017-041307

(51) Int. Cl.
*B62D 35/00* (2006.01)
*B62D 37/02* (2006.01)

(52) U.S. Cl.
CPC .......... *B62D 35/005* (2013.01); *B62D 37/02* (2013.01)

(58) Field of Classification Search
CPC ....... B62D 35/005; B62D 35/02; B62D 37/02
(Continued)

(56) References Cited

U.S. PATENT DOCUMENTS 4,778,212 A * 10/1988 Tomforde ............ B62D 35/005
296/180.1
5,511,847 A * 4/1996 Weisbarth ............... B60C 23/18
296/180.1
(Continued)

FOREIGN PATENT DOCUMENTS

DE 4334009 C1 1/1995
EP 1674381 A1 6/2006
(Continued)

OTHER PUBLICATIONS

The extended European search report issued by the European Patent Office dated Jan. 31, 2020, which corresponds to European Patent Application No. 18763148.6.
(Continued)

*Primary Examiner* — Gregory A Blankenship
(74) *Attorney, Agent, or Firm* — Studebaker & Brackett PC

(57) ABSTRACT

A tire deflector device configured such that a deflector is disposed on a bottom portion of a vehicle in front of a front wheel is provided. The deflector includes a guide surface extending substantially horizontally in a vehicle longitudinal direction, and a vertical wall portion including a surface extending downwardly on a rear portion of the guide surface and extending in a vehicle width direction. An angle defined by a lower portion of a vertical wall portion including at least a lower end of the vertical wall portion and an imaginary orthogonal plane orthogonal to the guide surface lies within a range from 20 degrees to 45 degrees.

17 Claims, 16 Drawing Sheets

(58) Field of Classification Search
USPC .................................................... 296/180.1
See application file for complete search history.

(56) References Cited

U.S. PATENT DOCUMENTS

| | | | | | |
|---|---|---|---|---|---|
| 6,070,933 | A * | 6/2000 | Tsukidate | ............. | B62D 35/005 |
| | | | | | 296/180.1 |
| 2012/0013146 | A1* | 1/2012 | Wolf | ...................... | B62D 35/02 |
| | | | | | 296/180.5 |
| 2015/0210324 | A1* | 7/2015 | Kojima | ............... | B62D 35/005 |
| | | | | | 296/180.1 |
| 2015/0225026 | A1* | 8/2015 | Ohira | ...................... | B62D 25/08 |
| | | | | | 296/180.1 |
| 2015/0266522 | A1* | 9/2015 | Ishikawa | .............. | B62D 35/005 |
| | | | | | 296/180.1 |
| 2016/0339970 | A1* | 11/2016 | Shibutake | .......... | B62D 25/2036 |
| 2017/0057567 | A1* | 3/2017 | Aoki | ...................... | B62D 37/02 |
| 2017/0101137 | A1* | 4/2017 | Tesch | ................... | B62D 35/005 |
| 2017/0144636 | A1* | 5/2017 | Schmidt | ................ | F16D 65/847 |
| 2017/0166267 | A1* | 6/2017 | Ribaldone | ............. | B62D 37/02 |
| 2017/0355333 | A1* | 12/2017 | Kishima | ............. | B62D 35/005 |
| 2018/0099703 | A1* | 4/2018 | Yoon | ................... | B62D 25/182 |
| 2018/0251165 | A1* | 9/2018 | Shibutake | ............ | B62D 35/005 |
| 2019/0061842 | A1* | 2/2019 | Thullier | ................. | B62D 37/02 |
| 2019/0168826 | A1* | 6/2019 | Wolf | .................... | B62D 35/005 |
| 2019/0276098 | A1* | 9/2019 | Fauser | ................... | B62D 35/02 |
| 2020/0010129 | A1* | 1/2020 | Ikawa | .................. | B62D 35/005 |
| 2020/0102026 | A1* | 4/2020 | Nishida | .................. | B62D 35/02 |
| 2020/0130755 | A1* | 4/2020 | Nishida | ................ | B62D 35/005 |
| 2020/0207427 | A1* | 7/2020 | Nakata | ................. | B62D 35/005 |
| 2020/0207428 | A1* | 7/2020 | Nakata | ................. | B62D 35/005 |
| 2020/0239087 | A1* | 7/2020 | Nakamura | ........... | B62D 35/005 |
| 2020/0361545 | A1* | 11/2020 | Nichols | ................. | B62D 25/18 |
| 2021/0016845 | A1* | 1/2021 | Knauer | ................. | B62D 35/02 |

FOREIGN PATENT DOCUMENTS

| | | | |
|---|---|---|---|
| EP | 2607215 | A2 | 6/2013 |
| JP | 2001233149 | A | 8/2001 |
| JP | 3543711 | B2 | 7/2004 |
| JP | 2014-054957 | A | 3/2014 |
| JP | 2016-215759 | A | 12/2016 |

OTHER PUBLICATIONS

International Search Report issued in PCT/JP2018/005977; dated May 1, 2018.

* cited by examiner

TIRE DEFLECTOR DEVICE

TECHNICAL FIELD

The present invention relates to a tire deflector device configured such that a deflector is disposed on a bottom portion of a vehicle in front of a front wheel.

BACKGROUND ART

Generally, it is known that a surrounding part of a front wheel (so-called front tire) is factor of generating air resistance. In other words, when traveling air from a vehicle front side flows out onto a vehicle side surface through a wheel house after entering the wheel house, an airflow around the vehicle side surface is disturbed, and a coefficient of air resistance (so-called Cd value) may be adversely affected. In view of this, how to reduce traveling air entering a wheel house is important in terms of improving a Cd value.

As a conventional art, a tire deflector structure disclosed in Patent Literature 1 has already been invented for the purpose of improving a Cd value.

The tire deflector structure disclosed in Patent Literature 1 includes a spats projecting downwardly of a vehicle at a position facing a front wheel. A bulging portion bulging upwardly of the vehicle is formed on an inner side in a vehicle width direction with respect to the spats. The tire deflector structure guides traveling air flowing on the bulging portion to a brake device, and cools the brake device by the traveling air, when the vehicle is traveling.

In the conventional structure disclosed in Patent Literature 1, however, traveling air flowing on the bulging portion is positively drawn into a wheel house. Therefore, when traveling air after cooling the brake device flows out onto the vehicle side surface through the wheel house, an airflow around the vehicle side surface is disturbed by the outflow air. Thus, the conventional structure may not sufficiently improve a Cd value.

CITATION LIST

Patent Literature

Patent Literature 1: Japanese Patent No. 3543711

SUMMARY OF INVENTION

An object of the present invention is to provide a tire deflector device that enables to improve a coefficient of air resistance (Cd value) by suppressing traveling air from hitting a front wheel in such a way that traveling air does not enter a wheel house.

The present invention is directed to a tire deflector device configured such that a deflector is disposed on a bottom portion of a vehicle in front of a front wheel. The deflector includes a guide surface extending substantially horizontally in a vehicle longitudinal direction, and a vertical wall portion including a surface extending downwardly on a rear portion of the guide surface and extending in a vehicle width direction. An angle defined by a lower portion of a vertical wall portion including at least a lower end of the vertical wall portion and an imaginary orthogonal plane orthogonal to the guide surface lies within a range from 20 degrees to 45 degrees.

DESCRIPTION OF EMBODIMENTS

In the following, an embodiment of the present invention is described in detail with reference to the drawings.

Figure 1:
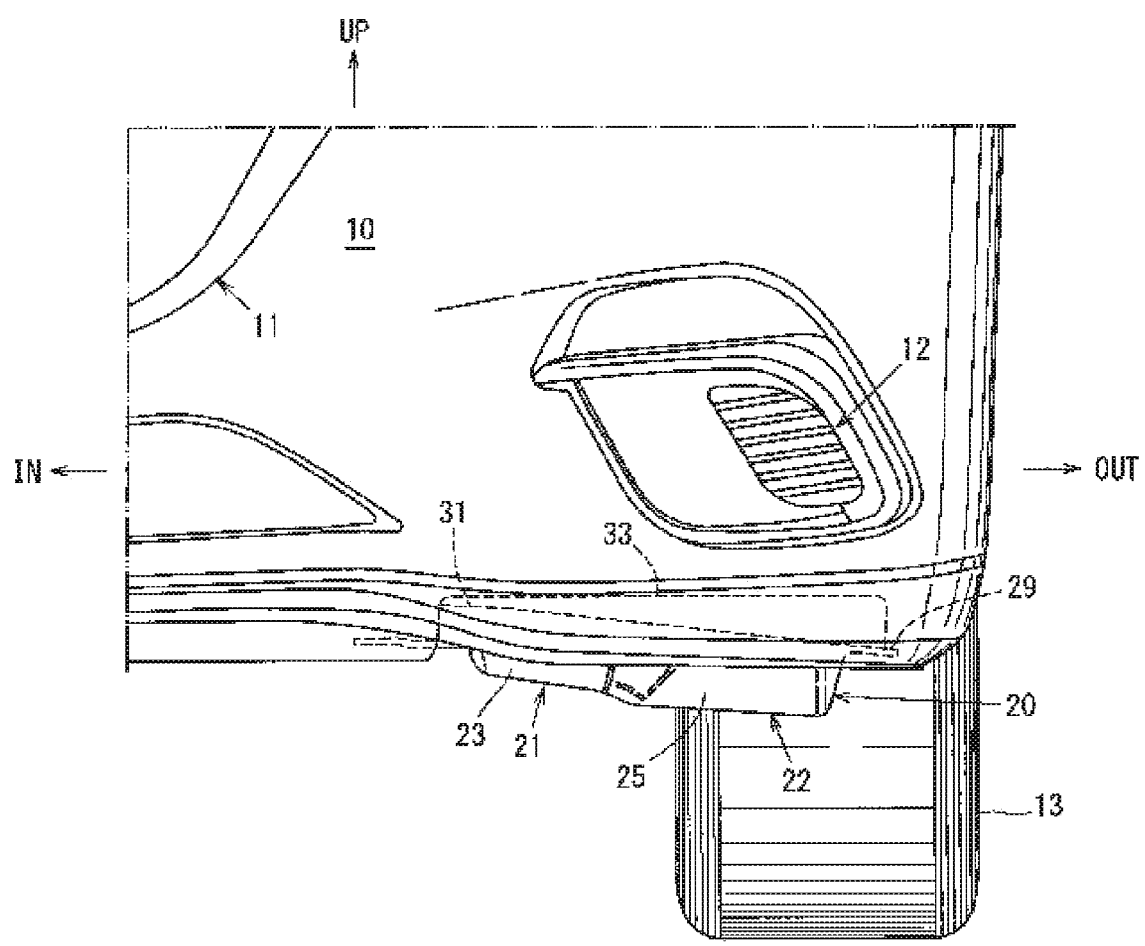
FIG. 1 is a front view illustrating essential parts of a vehicle including a tire deflector device according to the present invention.
Figure 2:
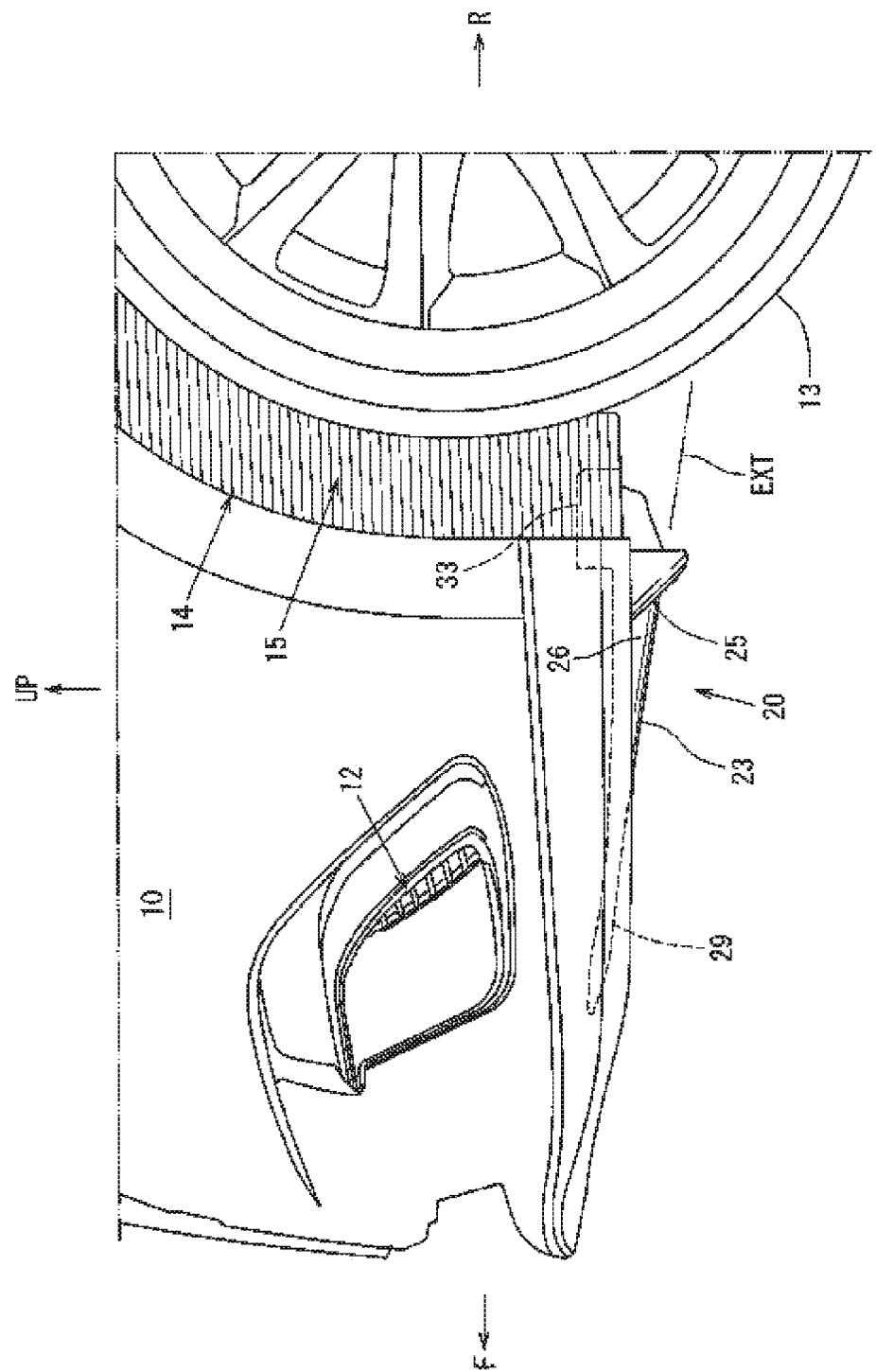
FIG. 2 is a left side view of FIG. 1.
Figure 3:
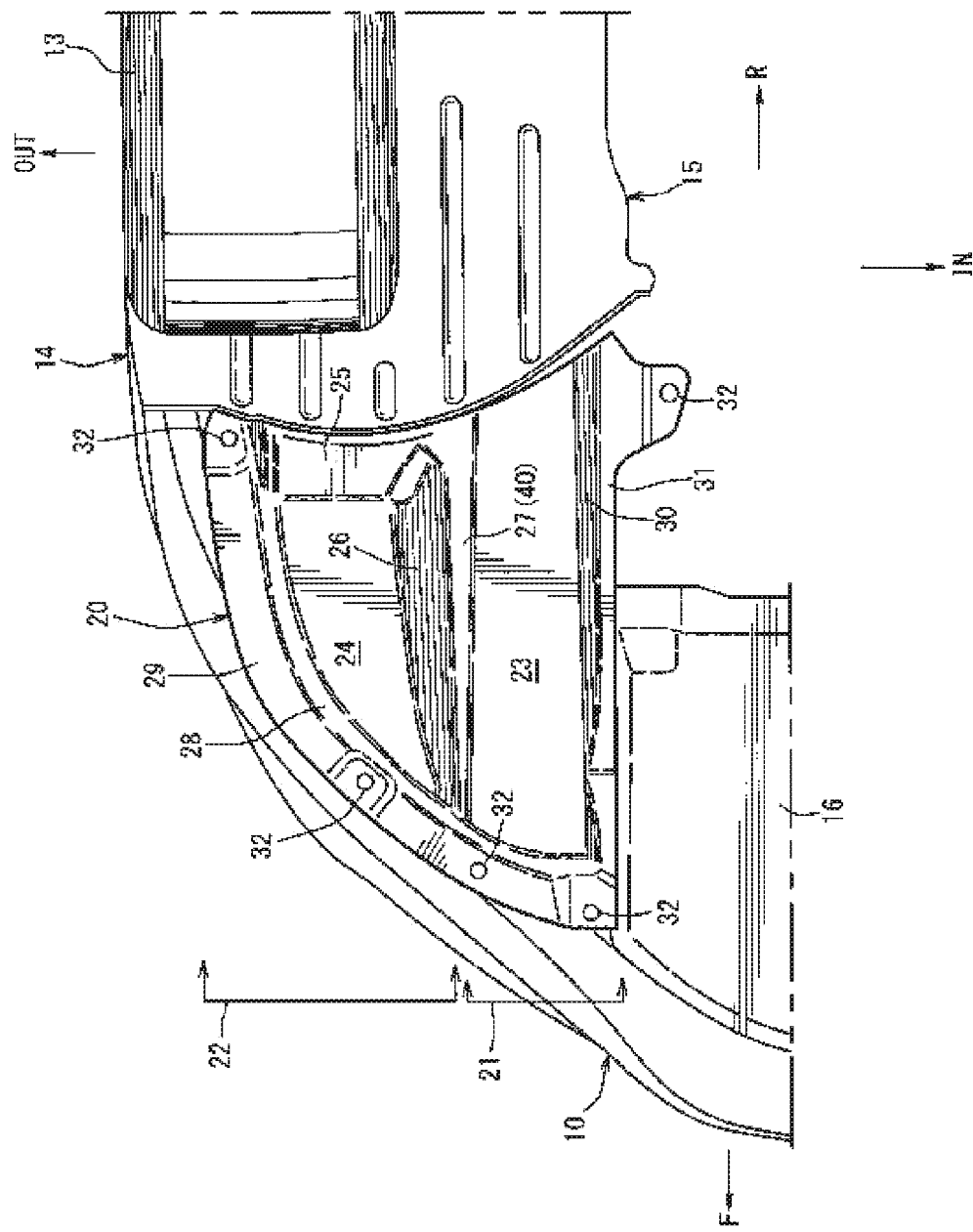
FIG. 3 is a bottom view of FIG. 1.
Figure 4:
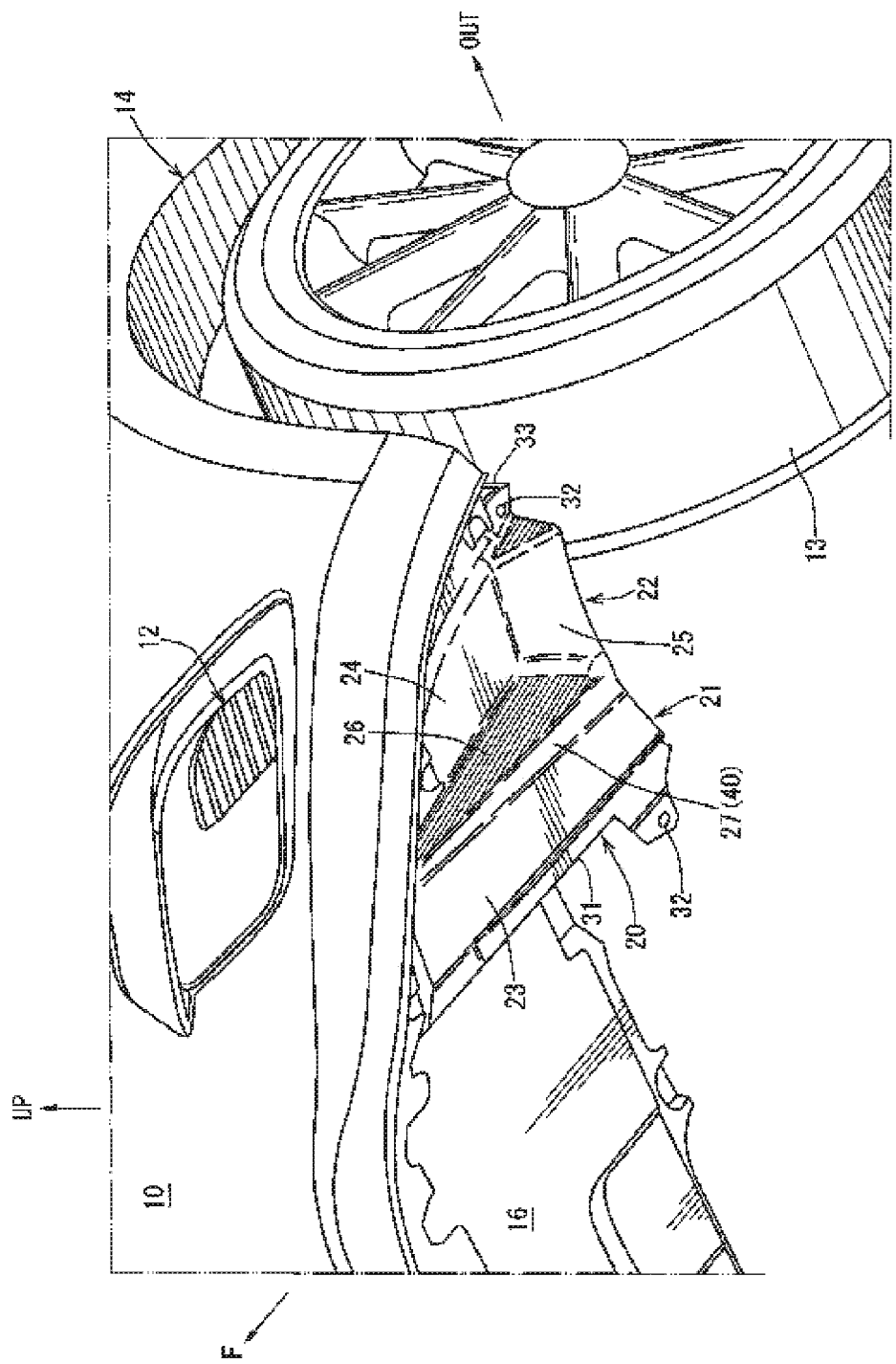
FIG. 4 is a perspective view of the vehicle illustrated in FIG. 1, when viewed obliquely from below.

FIG. 1 is a front view illustrating essential parts of a vehicle including a tire deflector device. FIG. 2 is a left side view of FIG. 1. FIG. 3 is a bottom view of FIG. 1. FIG. 4 is a perspective view of the vehicle illustrated in FIG. 1, when viewed obliquely from below.

In the drawings, the arrow "F" indicate a vehicle front side, the arrow "R" indicates a vehicle rear side, the arrow "OUT" indicates an outer side in a vehicle width direction, the arrow "IN" indicates an inner side in the vehicle width direction, and the arrow "UP" indicates a vehicle upper side.

As illustrated in FIGS. 1 to 4, the vehicle includes a front bumper face 10 located in front of an engine room. As illustrated in FIG. 1, a front grill 11 is provided at a middle portion of the front bumper face 10 in the vehicle width direction. Traveling air introducing portions 12 (in the drawings, only one traveling air introducing portion 12 on a vehicle left side is illustrated) are formed on lower portions of both left and right sides of the front bumper face 10 in the vehicle width direction.

A front fender panel for covering lateral portions of the engine room is continuously mounted, and a wheel house portion 14 for covering a majority of an upper portion of a front wheel 13 (so-called front tire) is formed on rear portions of both ends of the front bumper face 10 in the vehicle width direction.

The wheel house portion 14 includes a wheel house inner part and a wheel house outer part. As illustrated in FIG. 3, a splash shield (splash sealed, so-called mudguard member) 15 is provided on a wheel arch portion formed by the wheel house inner part and the wheel house outer part, on a side opposite to the front wheel 13.

As illustrated in FIG. 1, a convex-shaped deflector 20 (air guide member) is disposed on a bottom portion of the vehicle in front of the front wheel 13, when viewed from below in a vehicle longitudinal direction. In FIG. 1, only one deflector 20 in front of the front wheel 13 on a vehicle left side is illustrated. However, a deflector having a widthwise symmetrical structure or a substantially widthwise symmetrical structure with respect to the deflector 20 on the vehicle left side is disposed in front of a front wheel on a vehicle right side.

In the present embodiment, a downward projecting amount of the deflector 20 is set to such a value that a lowermost end of the deflector 20 projects up to a position corresponding to 20 to 25% of a diameter of the front wheel 13 from the ground. However, the projecting amount is not limited to this numerical value.

As illustrated in FIGS. 3 and 4, an undercover 16 (specifically, a center undercover) is provided on a bottom portion of the vehicle between the left and right deflectors 20 and 20 for straightening traveling air (in other words, underfloor air) flowing on the bottom portion of the vehicle.

Figure 5:
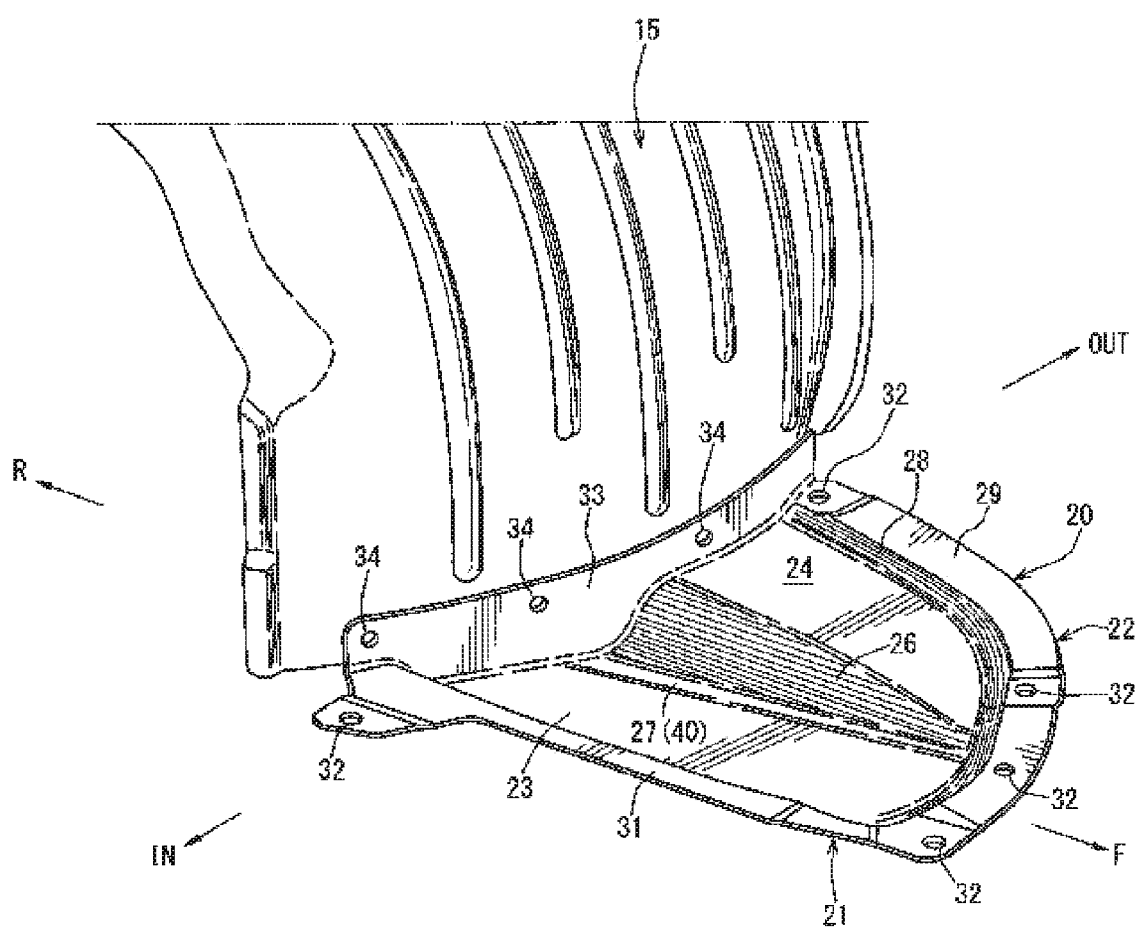
FIG. 5 is a perspective view illustrating a state that a deflector is mounted on a splash shield.
Figure 6:
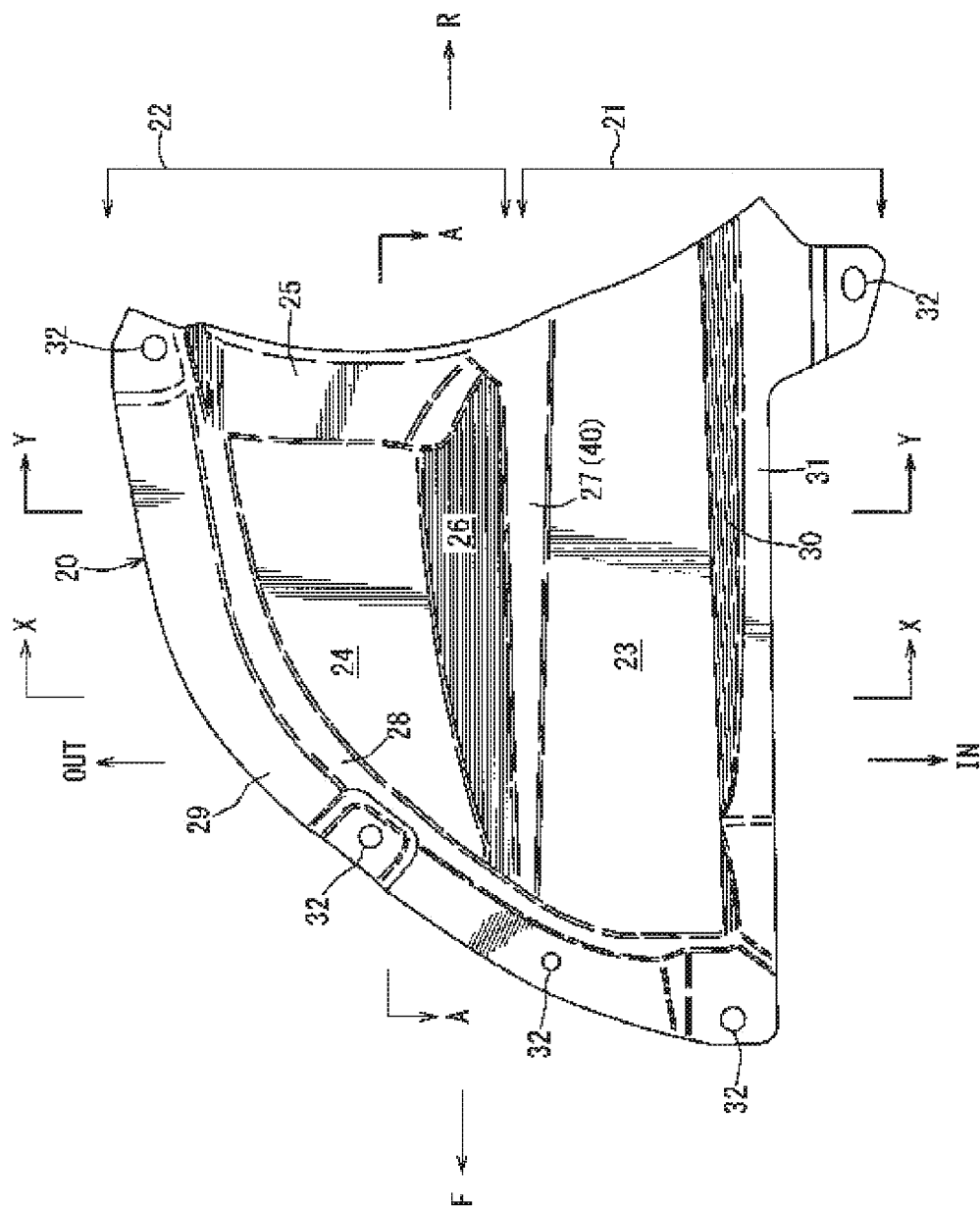
FIG. 6 is an enlarged bottom view illustrating the deflector.
Figure 7:
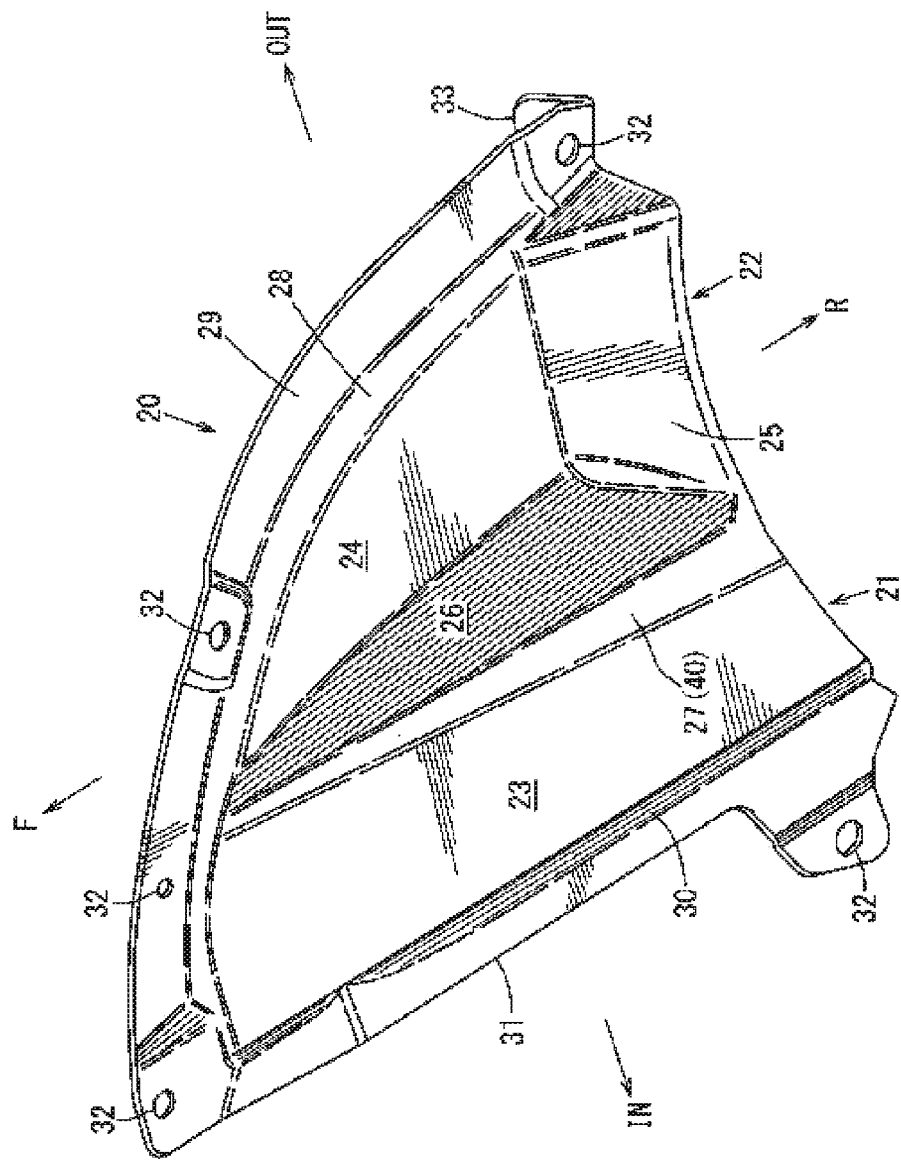
FIG. 7 is an enlarged perspective view of the deflector, when viewed obliquely from below.
Figure 8A:
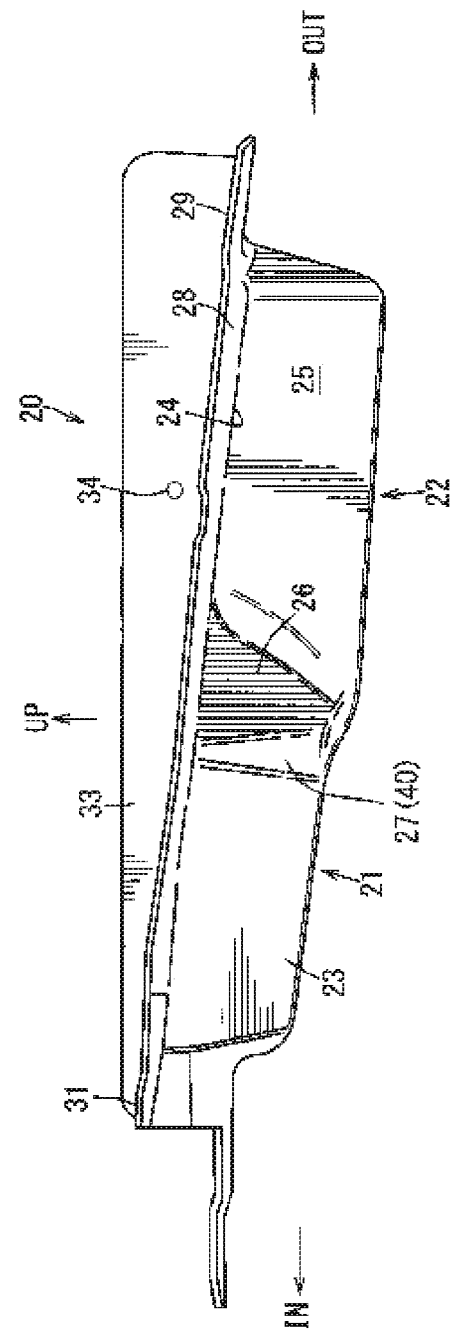
FIG. 8A is an enlarged front view of the deflector.
Figure 8B:
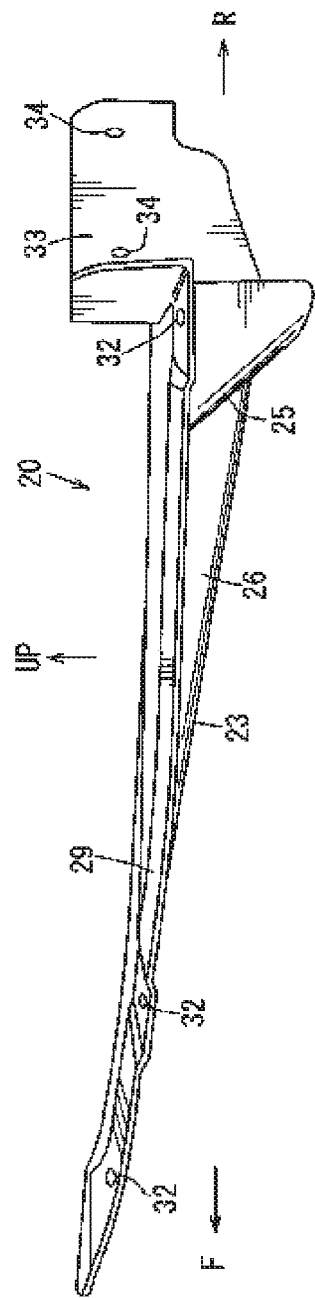
FIG. 8B is an enlarged side view of the deflector.
Figure 9A:
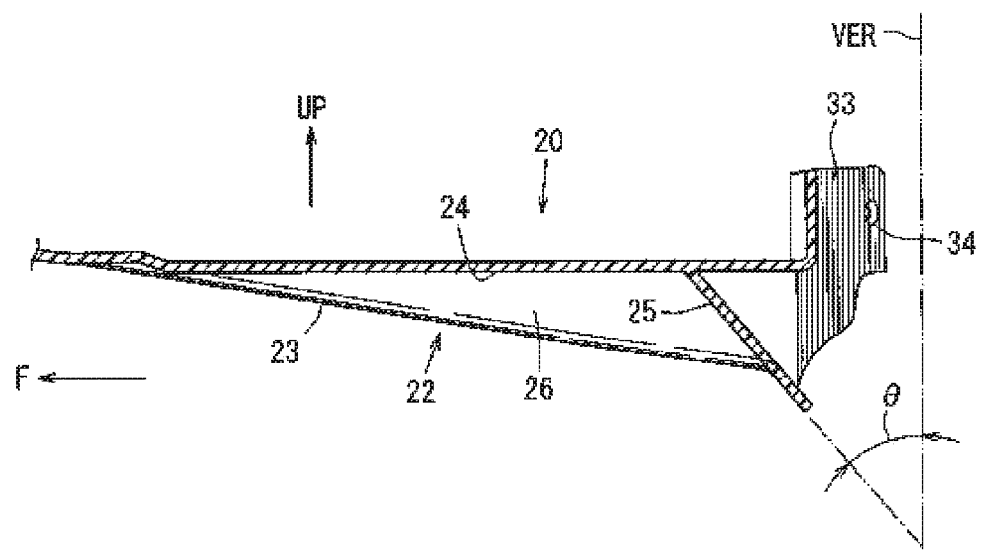
FIG. 9A is a cross-sectional view of essential parts taken along the line A-A in FIG. 5.
Figure 9B:
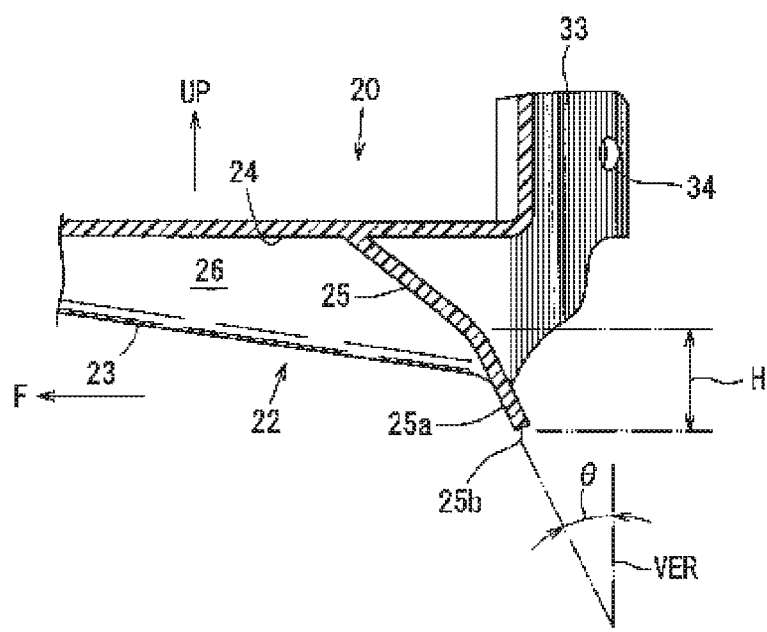
FIG. 9B is a partially enlarged cross-sectional view illustrating another embodiment of a vertical wall portion.
Figure 10A:
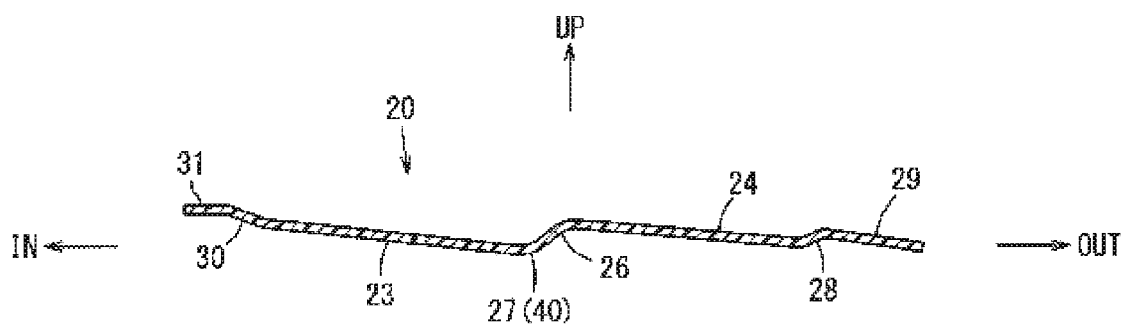
FIG. 10A is a cross-sectional view taken along the line X-X in FIG. 6.
Figure 10B:
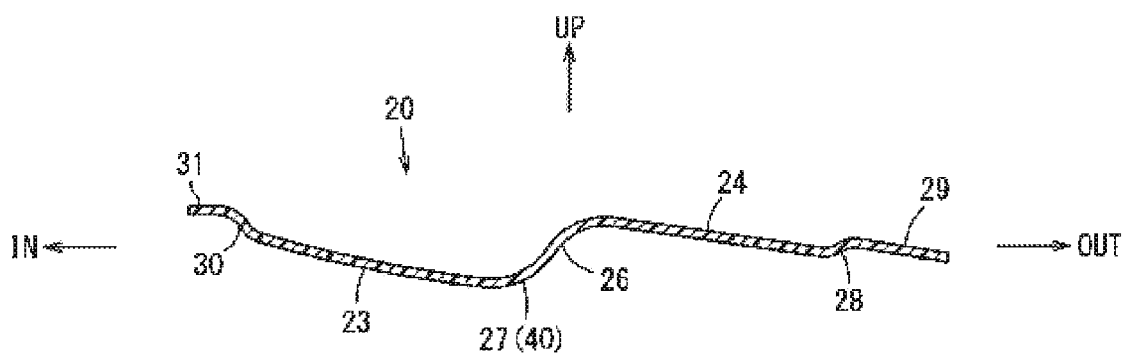
FIG. 10B is a cross-sectional view taken along the line Y-Y in FIG. 6.

FIG. 5 is a perspective view illustrating a state that the deflector 20 is mounted on the splash shield 15. FIG. 6 is an enlarged bottom view illustrating the deflector 20 alone. FIG. 7 is an enlarged perspective view illustrating the deflector 20 alone, when viewed obliquely from below. FIG. 8A is an enlarged front view of the deflector 20 alone. FIG. 8B is an enlarged side view of the deflector 20 alone. FIG. 9A is a cross-sectional view of essential parts taken along the line A-A in FIG. 6. FIG. 9B is a partially enlarged cross-sectional view illustrating another embodiment of a vertical wall structure. Further, FIG. 10A is a cross-sectional view taken along the line X-X in FIG. 6, and FIG. 10B is a cross-sectional view taken along the line Y-Y FIG. 6.

As illustrated in FIGS. 3 and 6, the deflector 20 includes a first air guide portion 21 located on an inner side in the vehicle width direction, a second air guide portion 22 located on an outer side in the vehicle width direction, and a side wall 26 as a connecting portion for connecting the first air guide portion 21 and the second air guide portion 22 in a vehicle vertical direction, and extending in the vehicle longitudinal direction. The deflector 20 is a member produced by integrally forming the first air guide portion 21, the second air guide portion 22, and the side wall 26, each of which is made of a material such as synthetic resin or fiber reinforced plastic. As illustrated in FIG. 3, in a state that the deflector 20 is mounted on a bottom portion of the vehicle, the first air guide portion 21 is located at such a position as not to overlap the front wheel 13 in the vehicle width direction (offset position), and the second air guide portion 22 is located at such a position (overlap position) as to overlap the front wheel 13 in the vehicle width direction.

As illustrated in FIGS. 6, 7, 8A and 8B, the first air guide portion 21 includes a moderately inclined surface 23 extending in the vehicle longitudinal direction, and inclined downwardly rearwardly. In the present embodiment, an angle of inclination of the moderately inclined surface 23 with respect to an imaginary horizontal line is set to about 10 degrees. However, the angle of inclination is not limited to this numerical value.

As illustrated in FIGS. 6, 7, 8A, and 8B, the second air guide portion 22 includes a substantially horizontal flat surface 24 (corresponding to a guide surface in the present invention) for guiding traveling air from a vehicle front side rearwardly and extending in the vehicle longitudinal direction, and a vertical wall portion 25 including a surface extending obliquely downwardly from a rear portion of the flat surface 24 and extending in the vehicle width direction. A length of the vertical wall portion 25 extending in the vehicle width direction is substantially equal to a length of the rear portion of the flat surface 24 in the vehicle width direction.

Further, the flat surface 24 is disposed in such a way that the ground height of the flat surface 24 is large as compared with the moderately inclined surface 23. In other words, the flat surface 24 is formed to be recessed upward with respect to the moderately inclined surface 23.

In this configuration, traveling air passing through a position of the deflector 20 which does not overlap the front wheel 13 in the vehicle width direction, in other words, traveling air passing through the first air guide portion 21 is allowed to flow as it is from a vehicle front side rearwardly of the vehicle, and traveling air passing through a position of the deflector 20 which overlaps the front wheel 13 in the vehicle width direction, in other words, only traveling air passing through the second air guide portion 22 is allowed to hit the vertical wall portion 25, thereby deflecting a flow of the traveling air downwardly by the vertical wall portion 25 in such a way as not to hit the front wheel 13, and outwardly in the vehicle width direction (since the side wall 26 is present on an inner side of the flat surface 24 and the vertical wall portion 25 in the vehicle width direction, an inward flow of traveling, air in the vehicle width direction is suppressed, and traveling air is deflected outwardly in the vehicle width direction). Thus, the configuration suppresses traveling air after hitting the front wheel 13 from entering the wheel house portion 14, and enables to improve a Cd value around the front wheel 13.

As illustrated in FIGS. 6 and 7, an outer portion of the moderately inclined surface 23 of the first air guide portion 21 in the vehicle width direction, and an inner portion of the flat surface 24 of the second air guide portion 22 in the vehicle width direction are connected by the side wall 26 extending in a vertical direction.

Further, as illustrated in FIGS. 3 and 6, the first air guide portion 21 and the second air guide portion 22 are disposed adjacent to each other, and a boundary portion 27 between the first air guide portion 21 and the second air guide portion 22, in other words, a lower end of the side wall 26 is formed in such a way as to be located on a further inner side in the vehicle width direction with respect to an innermost portion of the front wheel 13 (an innermost portion in the vehicle width direction), as illustrated in FIG. 3.

In this way, locating the boundary portion 27 on an inner side in the vehicle width direction with respect to an innermost portion of the front wheel 13 enables to prevent traveling air passing through the second air guide portion 22 from entering the wheel house portion 14.

Preferably, the boundary portion 27 is preferably located on an inner side in the vehicle width direction with respect to an innermost portion of the front wheel 13 by 5 to 40 mm.

Specifically, when the above value is smaller than 5 mm, traveling air flowing obliquely from a front side may hit the front wheel 13, and traveling air may enter the wheel house portion 14, thereby deteriorating a Cd value. On the other hand, when the value exceeds 40 mm, traveling air which is not supposed to enter the wheel house portion 14 may also be controlled or deflected downwardly by the flat surface 24 and the vertical wall portion 25 of the second air guide portion 22. This may split the airflow on a lower end of the vertical wall portion 25, and a Cd value may be deteriorated. In view of this, the above-described range is preferable.

As illustrated in FIGS. 5 and 6, a flange portion 29 is integrally connected between a front portion of the moderately inclined surface 23, and a front portion of the flat surface 24 and an outer end of the flat surface 24 in the vehicle width direction via a rising piece 28 having a relatively small size in the vertical direction.

Further, as illustrated in FIGS. 5, 6, and 7, a flange portion 31 is integrally connected to an inner end of the moderately inclined surface 23 in the vehicle width direction via a rising piece 30 having a relatively small size in the vertical direction.

The rising piece 28 and the flange portion 29 are formed into a substantially arc shape in a plan view. On the other hand, the rising piece 30 and the flange portion 31 are formed into a linear shape extending in the vehicle longitudinal direction in a plan view (see FIG. 6).

Further, the rising piece 28 and the flange portion 29 are connected in such a way as to form an L-shape in section (specifically, a lateral L-shape). Likewise, the rising piece 30 and the flange portion 31 are connected in such a way as to form an L-shape in section (specifically, a lateral L-shape). This configuration achieves improvement on rigidity of the deflector 20 (see FIG. 7).

Furthermore, a plurality of mounting portions 32 with respect to a bottom portion of the vehicle are formed on each of the flange portions 29 and 31. The deflector 20 is fixedly mounted to the bottom portion of the vehicle by using the mounting portions 32.

On the other hand, as illustrated in FIG. 5, a mounting piece 33 extending in the vertical direction is integrally formed on a rear end of the deflector 20, specifically, a rear end of each of the moderately inclined surface 23, the flat surface 24, the side wall 26, and the flange portions 29 and 31 in such a way as to align with a curved shape of a lower end of a front portion of the splash shield 15. A plurality of mounting portions 34 . . . are formed on the mounting piece 33. Mounting the mounting piece 33 on a front surface of a lower end of a front portion of the splash shield 15 by using the mounting portions 34 allows for the deflector 20 to be supported by the splash shield 15.

As illustrated in FIG. 2, in the vehicle, a front wheel suspension component such as a suspension arm including a lower arm, and a stabilizer, and a front wheel steering component such as a steering rod do not overlap an extension (EXT) of the moderately inclined surface 23 extending rearwardly of the vehicle in the vehicle longitudinal direction.

Traveling air passing through the first air guide portion 21 flows rearwardly of the vehicle, while moderately downwardly inclining along the moderately inclined surface 23. In this case, an angle of inclination of the moderately inclined surface 23 is set in such a way that traveling air does not hit a front wheel suspension component such as a suspension arm connected to the front wheel 13 (particularly, a knuckle portion of the front wheel 13), and a front wheel steering component such as a steering rod. Thus, traveling air is straightened.

As illustrated in FIG. 7, a lower end of the vertical wall portion 25, and a rear end of the moderately inclined surface 23 have a substantially same height in the vehicle vertical direction.

In this way, making a height of a lower end of the vertical wall portion 25, and a height of a rear end of the moderately inclined surface 23 substantially equal to each other on a rear end portion of the deflector 20 advantageously disperses concentration of stress applied to a boundary with respect to the vertical wall portion 25, and improves rigidity of the rear end portion of the deflector 20.

As illustrated in FIGS. 6, 7, 10A, and 10B, the boundary portion 27 between the first air guide portion 21 and the side wall 26 as a connecting portion is formed into a curved portion 40 having a curved shape. In other words, the flat surface 24 of the second air guide portion 22 is formed in such a way that the ground height of the flat surface 24 is large, as compared with the moderately inclined surface 23 of the first air guide portion 21. Therefore, as illustrated in FIGS. 4 and 7, a step in the vertical direction, whose height is substantially equal to a height of the side wall 26, is formed between the flat surface 24 and the moderately inclined surface 23. In view of this, the boundary portion 27 between the surfaces 24 and 23 is continued by the curved portion 40 having a curved shape.

According to this configuration, when traveling air flowing from a front inner side in the vehicle width direction obliquely outwardly, or traveling air (in other words, side; wind) flowing from an inner side in the vehicle width direction outwardly in the vehicle width direction flows from the first air guide portion 21 to the second air guide portion 22, the traveling air is controlled in such a way as to flow along the curved portion 40 formed on a step between the first air guide portion 21 and the second air guide portion 22, flow to the second air guide portion 22 without being split by the curved portion 40, and thereafter, hit the vertical wall portion 25 of a rear portion of the second air guide portion 22. Thus, intrusion of traveling air into the wheel house portion 14 is prevented, and a Cd value around the front wheel 13 is improved.

The curved portion 40 is formed to have a cross-sectional bending radius in a range from 5 mm to 40 mm.

Specifically, when a cross-sectional bending radius of the curved portion 40 is smaller than 5 mm, traveling air may be split. On the other hand, when a cross-sectional bending radius of the curved portion 40 exceeds 40 mm, the deflector 20 itself becomes oversized, and the ground height thereof may be reduced, in view of the above, a cross-sectional bending radius of the curved portion 40 is set within the above-described range.

In this way, setting a cross-sectional bending radius of the curved portion 40 in a range from 5 to 40 mm securely controls traveling air flowing from a front inner side in the vehicle width direction and from a side direction obliquely outwardly or outwardly in the vehicle width direction. Thus, split of traveling air, when traveling air flows from the first air guide portion 21 to the second air guide portion 22, is more advantageously and securely prevented.

Further, the curved portion 40 is formed to continue from a front outer end of the first air guide portion 21 in the vehicle width direction to a rear end thereof is the vehicle longitudinal direction. Thus, the curved portion 40 is formed to continue over the entirety of a step between the first air guide portion 21 and the second air guide portion 22 in the longitudinal direction. Accordingly, flow of traveling air from a front inner side in the vehicle width direction and from a side direction is securely controlled, and split of the traveling air (underfloor air flowing from the first air guide portion 21 to the second air guide portion 22) is more advantageously prevented.

Furthermore, a cross-sectional bending radius of the curved portion 40 is formed in such a way that a cross-sectional bending radius of a rear portion of the deflector 20 is large, as compared with a cross-sectional bending radius of a front portion of the deflector 20. Thus, even if a step between the first air guide portion 21 and the second air guide portion 22 increases rearwardly of the vehicle, it is easy to form the deflector 20.

As illustrated in FIG. 9A, the flat surface 24 is a substantially horizontal portion disposed substantially horizontally in the vehicle longitudinal direction. The flat surface 24 is formed in such a way that an angle θ (forwardly inclined angle) defined by at least a lower end of the vertical wall portion 25 (in the example illustrated in FIG. 9A, the entirety including a tower end of the vertical wall portion 25), and an imaginary orthogonal plane VER orthogonal to the flat surface 24 being the substantially horizontal portion lies in a range from 20 to 45 degrees.

Specifically, when the forwardly inclined angle θ is smaller than 20 degrees, the vertical wall portion 25 approaches a perpendicular direction, and swirls are formed around an end of the vertical wall portion 25 in the vehicle width direction. On the other hand, when the forwardly inclined angle θ exceeds 45 degrees (when the vertical wall portion 25 is excessively inclined forwardly), a collision wheel height, which is the height at which traveling air hits the front wheel 13 excessively increases. In view of the above, the forwardly inclined angle is set within the above-described range.

In this way, forming the flat surface 24 being a substantially horizontal portion on a vehicle front side of the vertical wall portion 25, and forwardly inclining the vertical wall portion 25 within the above-described range of the angle θ increases an amount of traveling air hitting the vertical wall portion 25, and prevents traveling air from entering the wheel house portion 14, Thus, air flowing laterally and rearwardly of the front wheel 13 is controlled, and improvement of a Cd value around the front wheel 13 is achieved.

In the example illustrated in FIG. 9A, the entirety of the vertical wall portion 25 is inclined into such a shape that a front part is high and a rear part is low within the above-described range of the forwardly inclined angle θ. Alternatively, as illustrated in FIG. 9B, only a lower end 25a of the vertical wall portion 25 may be inclined forwardly within the above-described range.

As illustrated in FIG. 9B, a height H in the vertical direction by which the lower end 25a of the vertical wall portion 25 is inclined forwardly may be at least about 10 mm from a lower end 25b of the vertical wall portion 25.

Figure 11:
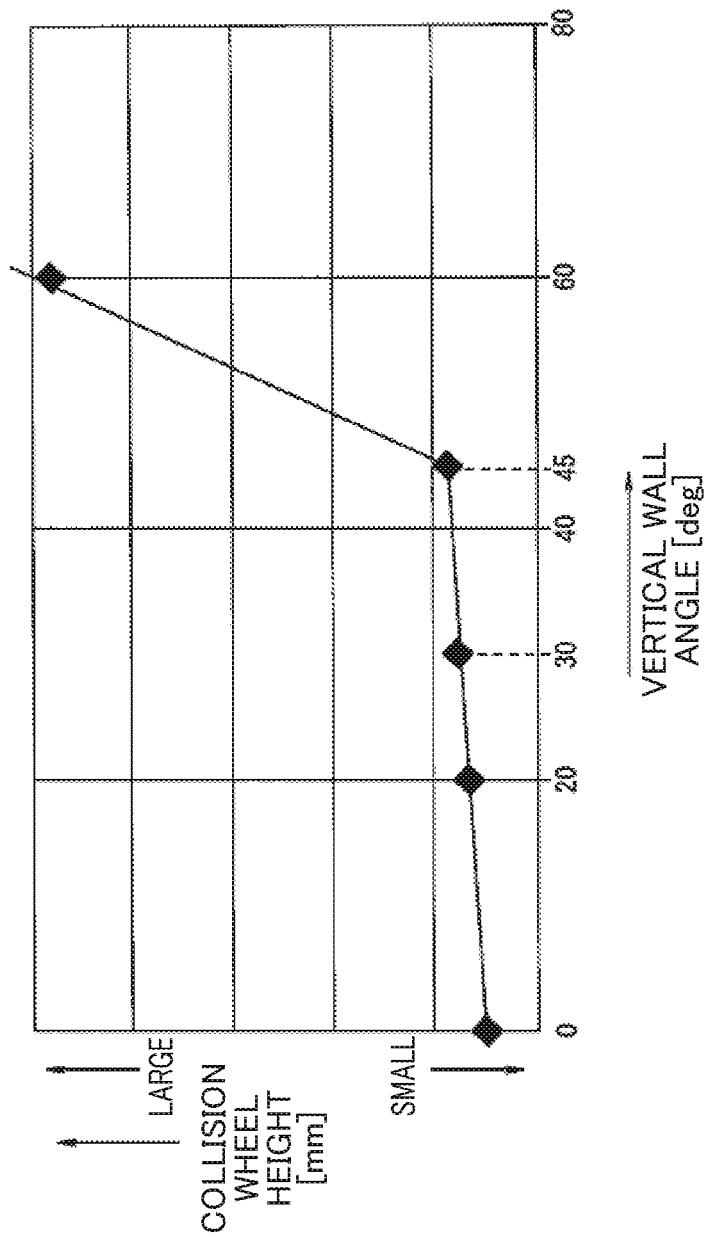
FIG. 11 is a characteristic diagram illustrating a collision wheel height with respect to a vertical wall angle.
Figure 12:
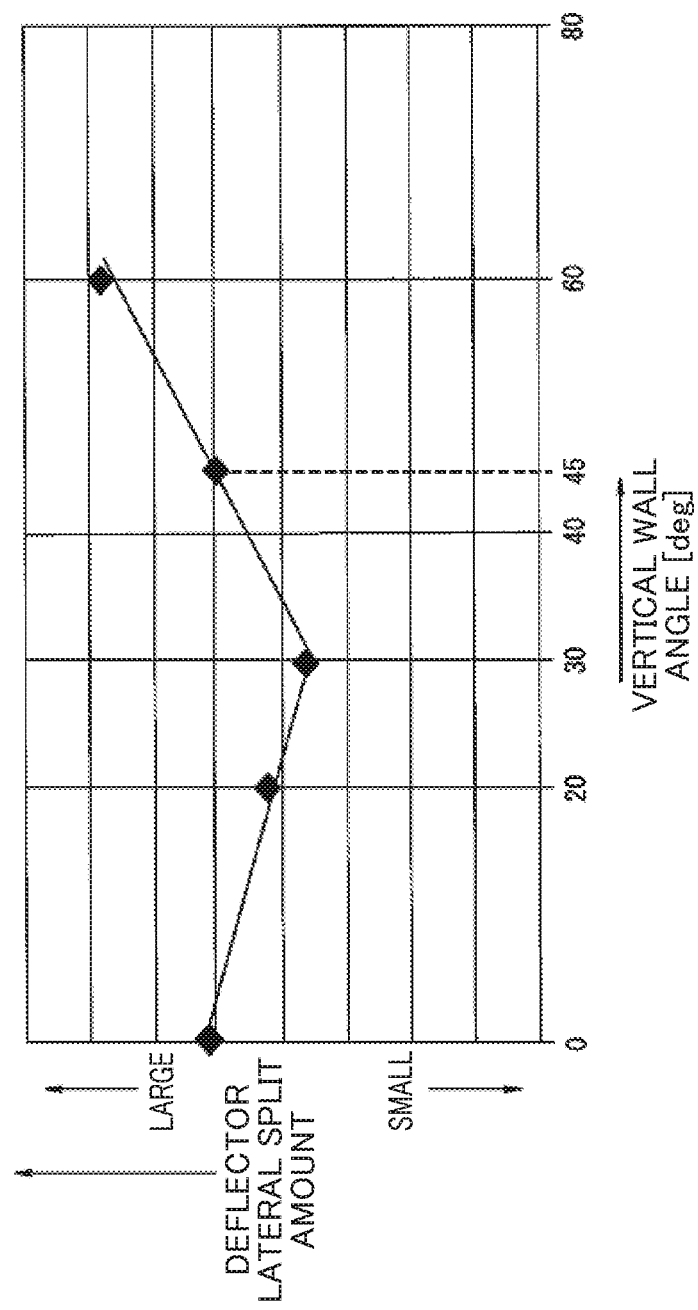
FIG. 12 is a characteristic diagram illustrating a deflector lateral split amount with respect to a vertical wall angle.
Figure 13:
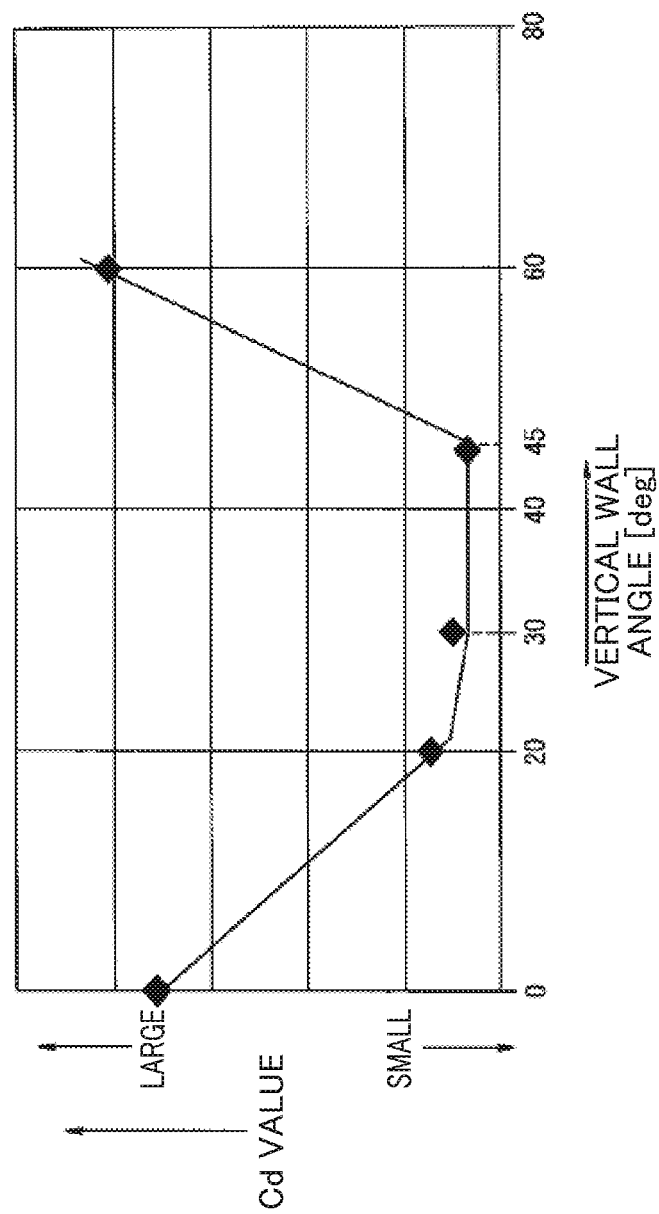
FIG. 13 is a characteristic diagram illustrating a Cd value with respect to a vertical wall angle.

FIG. 11 is a characteristic diagram illustrating a collision wheel height with respect to a vertical wall angle (see the forwardly inclined angle θ). FIG. 12 is a characteristic diagram illustrating a deflector lateral split amount with respect to a vertical wall angle (see the forwardly inclined angle θ). FIG. 13 is a characteristic diagram illustrating a Cd value with respect to a vertical wall angle (see the forwardly inclined angle θ).

A collision wheel height indicates a height, from the ground, of traveling air which hits the front wheel 13 after hitting the vertical wall portion 25, and whose flow is controlled by the vertical wall portion 25. The lower the height is, the less likely traveling air enters the wheel house portion 14. Further, a deflector lateral split amount indicates an amount by which traveling air is split on an outer end of the vertical wall portion 25 in the vehicle width direction. When the lateral split amount is large, swirls are formed, and a Cd value is adversely affected.

The inventors of the present application manufactured various deflectors, whose forwardly inclined angles are different, namely, 0 degree, 20 degrees, 30 degrees, 45 degrees, and 60 degrees, and conducted an experiment in a same condition by mounting these deflectors on a bottom portion of a vehicle in order to verify which range is optimum for the forwardly inclined angle θ of the vertical wall portion 25.

As illustrated in FIG. 11, when the forwardly inclined angle θ exceeds 45 degrees, a collision wheel height excessively increases. As illustrated in FIG. 12, when the forwardly inclined angle θ is 30 degrees, a lateral split amount is smallest. When the forwardly inclined angle θ is smaller than 30 degrees and when the forwardly inclined angle θ is larger than 30 degrees, a lateral split amount increases. It is confirmed that, as far as the forwardly inclined angle θ lies within a range from 20 degrees to 45 degrees, a lateral split amount also lies within an allowable range. As illustrated in FIG. 13, it is confirmed that a Cd value exhibits a satisfactory value, when the forwardly inclined angle θ lies within a range from 20 degrees to 45 degrees; and when the forwardly inclined angle θ is smaller than 20 degrees, and when the forwardly inclined angle θ exceeds 45 degrees, a Cd value increases, which is not preferable.

From the above-described experiment result, it can be said that setting the forwardly inclined angle θ in a range from 20 degrees to 45 degrees is preferable, and 30 degrees is most preferable.

In addition to the above, as illustrated in FIG. 3, the second air guide portion 22 and the vertical wall portion 25 are disposed at such a position (overlap position) as to overlap the front wheel 13 in the vehicle width direction. Thus, a flow of traveling air hitting the front wheel 13 is securely suppressed by the vertical wall portion 25.

In this way, a tire deflector device according to the embodiment is a tire deflector device configured such that the deflector 20 is disposed on a bottom portion of a vehicle in front of the front wheel 13. The deflector 20 includes the flat surface 24 (guide surface) extending substantially horizontally in the vehicle longitudinal direction, and the vertical wall portion 25 including a surface extending downwardly on a rear portion of the flat surface 24 (guide surface) and extending in the vehicle width direction. An angle defined by a lower portion of the vertical wall portion 25 including at least a lower end of the vertical wall portion 25, and an imaginary orthogonal plane VER orthogonal to the flat surface 24 (guide surface) lies within a range from 20 degrees to 45 degrees (see FIGS. 4, 9A, and 9B).

In this configuration, in the deflector 20, forming the flat surface 24 (guide surface) on a vehicle front side of the vertical wall portion 25 increases an amount of traveling air hitting the vertical wall portion 25, and air flowing laterally and rearwardly of the front wheel 13 is controlled in such a way that traveling air does not enter the wheel house portion 14. Therefore, it is possible to improve a Cd value around the front wheel 13 (see FIG. 12).

In particular, since the angle (forwardly inclined angle θ) defined by a lower portion of the vertical wall portion 25 including at least a lower end of the vertical wall portion 25, and the imaginary orthogonal plane VER orthogonal to the substantially horizontal portion is set in a range from 20 degrees to 45 degrees, a Cd value around the front wheel is kept low.

Specifically, when the forwardly inclined angle θ is smaller than 20 degrees, swirls are formed around an end of the vertical wall portion 25 in the vehicle width direction (see FIG. 12). When the forwardly inclined angle θ exceeds 45 degrees, a collision wheel height at which traveling air hits the front wheel 13 excessively increases (see FIG. 11). In view of the above, the forwardly inclined angle θ is set in the above-described range.

In the tire deflector device, the vertical wall portion 25 is formed at such a position as to overlap the front wheel 13 in the vehicle width direction (see FIG. 3).

In this configuration, forming the vertical wall portion 25 at such a position as to overlap the front wheel 13 in the vehicle width direction enables to securely suppress flow of traveling air from hitting the front wheel 13. In other words, since traveling air is deflected downwardly by the vertical wall portion 25, it is possible to control in such a way that traveling air does not hit the front wheel 13.

In the tire deflector device, the angle θ defined by a lower portion of the vertical wall portion 25 including at least a lower end of the vertical wall portion 25, and the imaginary orthogonal plane VER orthogonal to the flat surface 24 (guide surface) is set to 30 degrees (see FIGS. 9A and 9B).

In this configuration, since the angle θ is set to 30 degrees, it is possible to more advantageously and securely prevent swirls from being formed around an end of the vertical wall portion 25 in the vehicle width direction, and it is possible to reduce a collision wheel height at which traveling air bits the front wheel 13.

In the tire deflector device, the deflector 20 includes the first air guide portion 21 located on an inner side in the vehicle width direction, and the second air guide portion 22 adjacent to the first air guide portion 21 on an outer side in the vehicle width direction. The first air guide portion 21 includes the moderately inclined surface 23 inclined downwardly rearwardly. The first air guide portion 21 is located at such a position as not to overlap the front wheel 13 in the vehicle width direction. The second air guide portion 22 is located at such a position as to overlap the front wheel 13 in the vehicle width direction, and at such a position as to overlap at least an innermost portion of the front wheel 13. The flat surface 24 (guide surface) is disposed in such a way that the ground height of the flat surface 24 is large, as compared with the moderately inclined surface 23 (see FIGS. 1, 3, and 4).

In this configuration, traveling air, which does not overlap the front wheel 13 in the vehicle width direction (traveling air passing through the first air guide portion 21), is allowed to flow as it is from a vehicle front side rearwardly of the vehicle, and only traveling air, which overlaps, in the vehicle width direction, the front wheel 13 including an innermost portion of the front wheel 13 in the vehicle width direction (traveling air passing through the second guide portion 22), is allowed to hit the vertical wall portion 25, whereby it is possible to deflect a flow of the traveling air downwardly and outwardly in the vehicle width direction in such a way as not to hit the front wheel. Therefore, it is possible to suppress traveling air after hitting the front wheel 13 from entering the wheel house portion 14, and improve a Cd value around the front wheel 13.

In the tire deflector device, a front wheel suspension component or a front wheel steering component does not overlap an extension (EXT) of the moderately inclined surface 23 in the longitudinal direction (see FIG. 2).

In this configuration, traveling air passing through the first air guide portion 21 is inclined moderately downwardly along the moderately inclined surface 23, and flows rearwardly of the vehicle. Since traveling air does not hit a front wheel suspension component such as a suspension arm connected to the front wheel 13 (particularly, a knuckle portion of the front wheel 13), and a front wheel steering component such as a steering rod, it is possible to straighten traveling air.

In the tire deflector device, the boundary portion 27 between the first air guide portion 21 and the second air guide portion 22 is located on an inner side in the vehicle width direction with respect to an innermost portion of the front wheel 13 (see FIG. 3).

In this configuration, since the boundary portion 27 is located on an inner side in the vehicle width direction with respect to the innermost portion of the front wheel 13, it is possible to prevent traveling air passing through the second air guide portion 22 from entering the wheel house portion 14.

The boundary portion 27 is preferably located on an inner side in the vehicle width direction with respect to an innermost portion of the front wheel 13 by 5 to 40 mm. Specifically, when the above-described value is smaller than 5 mm, traveling air flowing obliquely from a front side may hit the front wheel 13, and traveling air may enter the wheel house portion 14, thereby deteriorating a Cd value. On the other hand, when the above-described value exceeds 40 mm, traveling air which is not supposed to enter the wheel house portion 14 may also be controlled or deflected downwardly by the guide surface (flat surface 24) and the vertical wall portion 25 of the second air guide portion 22, and may be split on a lower end of the vertical wall portion 25, thereby deteriorating a Cd value. In view of this, the above-described range is preferable.

In the tire deflector device, a lower end of the vertical wall portion 25, and a rear end of the moderately inclined surface 23 have a substantially same height (see FIG. 7).

In this configuration, since a height of a lower end of the vertical wall portion 25, and a height of a rear end of the moderately inclined surface 23 located on a read end portion of the deflector 20 are made substantially equal to each other on the rear end portion of the deflector 20, it is possible to advantageously disperse concentration of stress applied to a boundary with respect to the vertical wall portion 25, and it is possible to improve rigidity of the rear end portion of the deflector 20.

The following is an overview of the present invention described above.

A tire deflector device according to the present invention is a tire deflector device configured such that a deflector is disposed on a bottom portion of a vehicle in from of a front wheel. The deflector includes a guide surface extending substantially horizontally in a vehicle longitudinal direction, and a vertical wall portion including a surface extending downwardly on a rear portion of the guide surface and extending in a vehicle width direction. An angle defined by a lower portion of a vertical wall portion including at least a lower end of the vertical wall portion and an imaginary orthogonal plane orthogonal to the guide surface lies within a range from 20 degrees to 45 degrees.

In the above configuration, in the deflector, forming the guide surface on a vehicle front side of the vertical wall portion increases an amount of traveling air hitting the vertical wall portion, and air flowing laterally and rearwardly of the front wheel is controlled in such a way that traveling air does not enter a wheel house portion. Therefore, it is possible to improve a Cd value around the front wheel.

In particular, since the angle (forwardly inclined angle) defined by the vertical wall portion and the imaginary orthogonal plane orthogonal to a substantially horizontal portion is set in the range from 20 degrees to 45 degrees, a Cd value around the front wheel is kept low.

Specifically, when the forwardly inclined angle is smaller than 20 degrees, swirls are formed around an end of the vertical wall portion in the vehicle width direction. When the forwardly inclined angle exceeds 45 degrees, a collision wheel height at which traveling air hits the front wheel excessively increases. In view of the above, the forwardly inclined angle is set within the above-described range.

In the tire deflector device, preferably, the angle defined by the lower portion of the vertical wall portion and the imaginary orthogonal plane may be 30 degrees.

In the above configuration, it is possible to more advantageously and securely prevent swirls from being formed around an end of the vertical wall portion in the vehicle width direction, and it is possible to reduce a collision wheel height at which traveling air hits the front wheel.

In the tire deflector device, the vertical wall portion may be formed at such a position as to overlap the front wheel in the vehicle width direction.

In the above configuration, it is possible to securely suppress flow of traveling aft from hitting the front wheel. In other words, since traveling air is deflected downwardly by the vertical wall portion, it is possible to control the traveling air in such a way as not to hit the front wheel.

In the tire deflector device, when it is assumed that the guide surface and the vertical wall portion are a second air guide portion, the deflector may include a first air guide portion located on an inner side in the vehicle width direction, and the second air guide portion adjacent to the first air guide portion on an outer side in the vehicle width direction. The first air guide portion may include a moderately inclined surface inclined downwardly rearwardly, and may be located at such a position as not to overlap the front wheel in the vehicle width direction. The second air guide portion may be located at such a position as to overlap the front wheel in the vehicle width direction, and at such a position as to overlap at least an innermost portion of the front wheel. The guide surface may be disposed in such a way that a ground height of the guide surface is large as compared with the moderately inclined surface.

In the above configuration, traveling air, which does not overlap the front wheel in the vehicle width direction (traveling air passing through the first air guide portion), is allowed to flow from a vehicle front side rearwardly of the vehicle, and only traveling air, which overlaps, in the vehicle width direction, the front wheel including an innermost portion of the front wheel in the vehicle width direction (traveling air passing through the second guide portion), is allowed to hit the vertical wall portion, whereby it is possible to deflect a flow of the traveling air downwardly and outwardly in the vehicle width direction in such a way as not to hit the front wheel. Therefore, it is possible to suppress traveling air after hitting the front wheel from entering a wheel house, and improve a Cd value around the front wheel.

In the tire deflector device, the vehicle may include a front wheel suspension component or a front wheel steering component. The front wheel suspension component or the front wheel steering component may not overlap an extension of the moderately inclined surface in the vehicle longitudinal direction.

Examples of the front wheel suspension component are a suspension arm such as a lower arm, and a stabilizer. An example of the front wheel steering component is a steering rod.

In the above configuration, traveling air passing through the first air guide portion is inclined moderately downwardly along the moderately inclined surface, and flows rearwardly of the vehicle. Since traveling air does not hit a front wheel suspension component such as a suspension arm connected to the front wheel (particularly, a knuckle portion of the front wheel), and a front wheel steering component such as a steering rod, it is possible to straighten traveling air.

In the tire deflector device, a boundary portion between the first air guide portion and the second air guide portion may be located on an inner side in the vehicle width direction with respect to the innermost portion of the front wheel.

In the above configuration, it is possible to prevent traveling air passing through the second air guide portion from entering the wheel house.

It is preferable that the boundary portion is located on an inner side in the vehicle width direction with respect to an innermost portion of the front wheel by 5 to 40 mm. Specifically. When the above-described value is smaller than 5 mm, traveling air flowing obliquely from a front side may hit the front wheel, and traveling air may enter the wheel house, thereby deteriorating a Cd value. On the other hand, when the above-described value exceeds 40 mm, traveling air which is not supposed to enter the wheel house may also be controlled or deflected downwardly by the guide surface and the vertical wall portion of the second air guide portion, and may be split on a lower end of the vertical wall portion, thereby deteriorating a Cd value. In view of this, the above-described range is preferable.

In the tire deflector device, a lower end of the vertical wall portion and a rear end of the moderately inclined surface may have substantially a same height.

In the above configuration, since a height of a lower end of the vertical wall portion, and a height of a rear end of the moderately inclined surface are made substantially equal to each other on a rear end portion of the deflector, it is possible to advantageously disperse concentration of stress applied to a boundary with respect to the vertical wall portion, and it is possible to improve rigidity of the rear end portion of the deflector.

INDUSTRIAL APPLICABILITY

As described above, the present invention is useful for a tire deflector device configured such that a deflector is disposed on a bottom portion of a vehicle in front of a front wheel.

The invention claimed is:
1. A tire deflector device to be disposed on a bottom portion of a vehicle in front of a front wheel, comprising:
the deflector includes
a guide surface extending substantially horizontally in a vehicle longitudinal direction, and
a vertical wall portion including a surface extending downwardly on a rear portion of the guide surface and extending in a vehicle width direction, wherein
an angle defined by a lower portion of a vertical wall portion including at least a lower end of the vertical wall portion and an imaginary orthogonal plane orthogonal to the guide surface lies within a range from 20 degrees to 45 degrees,
when it is assumed that the guide surface and the vertical wall portion are a second air guide portion,
the deflector includes a first air guide portion located on an inner side in the vehicle width direction, and the second air guide portion adjacent to the first air guide portion on an outer side in the vehicle width direction,
the first air guide portion includes a moderately inclined surface inclined downwardly rearwardly, and is located at such a position as not to overlap the front wheel in the vehicle width direction,
the second air guide portion is located at such a position as to overlap the front wheel in the vehicle width direction, and at such a position as to overlap at least an innermost portion of the front wheel, and
the guide surface is disposed in such a way that a ground height of the guide surface is large as compared with the moderately inclined surface.

2. The tire deflector device according to claim 1, wherein the vertical wall portion is formed at such a position as to overlap the front wheel in the vehicle width direction.

3. The tire deflector device according to claim 1, wherein the vehicle includes a front wheel suspension component or a front wheel steering component, and
the front wheel suspension component or the front wheel steering component does not overlap an extension of the moderately inclined surface in the vehicle longitudinal direction.

4. The tire deflector device according to claim 1, wherein a boundary portion between the first air guide portion and the second air guide portion is located on an inner side in the vehicle width direction with respect to the innermost portion of the front wheel.

5. The tire deflector device according to claim 1, wherein a lower end of the vertical wall portion and a rear end of the moderately inclined surface have substantially a same height.

6. The tire deflector device according to claim 3, wherein a boundary portion between the first air guide portion and the second air guide portion is located on an inner side in the vehicle width direction with respect to the innermost portion of the front wheel.

7. The tire deflector device according to claim 3, wherein a lower end of the vertical wall portion and a rear end of the moderately inclined surface have substantially a same height.

8. The tire deflector device according to claim 4, wherein a lower end of the vertical wall portion and a rear end of the moderately inclined surface have substantially a same height.

9. The tire deflector device according to claim 6, wherein a lower end of the vertical wall portion and a rear end of the moderately inclined surface have substantially a same height.

10. A tire deflector device to be disposed on a bottom portion of a vehicle in front of a front wheel, comprising:
the deflector includes
a guide surface extending substantially horizontally in a vehicle longitudinal direction, and
a vertical wall portion including a surface extending downwardly on a rear portion of the guide surface and extending in a vehicle width direction, wherein
an angle defined by a lower portion of a vertical wall portion including at least a lower end of the vertical wall portion and an imaginary orthogonal plane orthogonal to the guide surface is 30 degrees,
when it is assumed that the guide surface and the vertical wall portion are a second air guide portion,
the deflector includes a first air guide portion located on an inner side in the vehicle width direction, and the second air guide portion adjacent to the first air guide portion on an outer side in the vehicle width direction,
the first air guide portion includes a moderately inclined surface inclined downwardly rearwardly, and is located at such a position as not to overlap the front wheel in the vehicle width direction,
the second air guide portion is located at such a position as to overlap the front wheel in the vehicle width direction, and at such a position as to overlap at least an innermost portion of the front wheel, and
the guide surface is disposed in such a way that a ground height of the guide surface is large as compared with the moderately inclined surface.

11. The tire deflector device according to claim 10, wherein
the vertical wall portion is formed at such a position as to overlap the front wheel in the vehicle width direction.

12. The tire deflector device according to claim 10, wherein
the vehicle includes a front wheel suspension component or a front wheel steering component, and
the front wheel suspension component or the front wheel steering component does not overlap an extension of the moderately inclined surface in the vehicle longitudinal direction.

13. The tire deflector device according to claim 10, wherein
a boundary portion between the first air guide portion and the second air guide portion is located on an inner side in the vehicle width direction with respect to the innermost portion of the front wheel.

14. The tire deflector device according to claim 12, wherein
a boundary portion between the first air guide portion and the second air guide portion is located on an inner side in the vehicle width direction with respect to the innermost portion of the front wheel.

15. The tire deflector device according to claim 12, wherein
a lower end of the vertical wall portion and a rear end of the moderately inclined surface have substantially a same height.

16. The tire deflector device according to claim 13, wherein
a lower end of the vertical wall portion and a rear end of the moderately inclined surface have substantially a same height.

17. The tire deflector device according to claim 14, wherein
a lower end of the vertical wall portion and a rear end of the moderately inclined surface have substantially a same height.

* * * * *